(12) United States Patent
Durant et al.

(45) Date of Patent: Oct. 12, 2004
(10) Patent No.: US 6,804,226 B1

(54) METHOD AND APPARATUS FOR CONNECTING LOCAL SUBSCRIBERS TO A LAN

(75) Inventors: Gregory Michael Durant, Neshanic Station, NJ (US); Christopher Lee Rutledge, Somerset, NJ (US); Edward Wronka, Morris Plains, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/270,407

(22) Filed: Mar. 16, 1999

Related U.S. Application Data (60) Provisional application No. 60/114,489, filed on Dec. 31, 1998.

(51) Int. Cl.[7] .......................... H04L 12/28; H04L 12/66; H04M 11/00
(52) U.S. Cl. .................... 370/355; 370/395.2; 370/351; 370/400; 379/92.03
(58) Field of Search ................................ 370/352, 351, 370/353, 354, 493, 494, 495, 395.1, 400; 375/222; 359/118, 119, 113, 115; 379/333, 334, 406, 92.03, 92.04, 93.01

(56) References Cited

U.S. PATENT DOCUMENTS

| | | | | |
|---|---|---|---|---|
| 5,991,292 A | * | 11/1999 | Focsaneanu et al. | 370/352 |
| 6,069,879 A | * | 5/2000 | Chatter | 370/295 |
| 6,101,182 A | * | 8/2000 | Sistanizadeh et al. | 370/352 |
| 6,349,096 B1 | * | 2/2002 | Liu et al. | 370/352 |
| 6,388,990 B1 | * | 5/2002 | Wetzel | 370/230 |
| 6,466,572 B1 | * | 10/2002 | Ethridge et al. | 370/352 |

* cited by examiner

*Primary Examiner*—Hanh Nguyen (57) ABSTRACT

The present invention provides a method and apparatus for allowing the copper pair at each subscriber site to reappear at the CO. It also provides inter-connectivity between subscribers within a specified proximity, thereby allowing the subscribers to operate as a LAN. By placing a router between various Distributed Point of Presence Local Area Networks (DPOPLAN) and service provider that offer services such as Internet access, a large communication can easily be created.

12 Claims, 7 Drawing Sheets

METHOD AND APPARATUS FOR CONNECTING LOCAL SUBSCRIBERS TO A LAN

PRIOR PROVISIONAL PATENT APPLICATION

The present application claims the benefit of U.S. Provisional Application No. 60/114,489, filed Dec. 31, 1998.

FIELD OF THE INVENTION

The present invention pertains to the telephone network and in particular, to the local loop that extends from the subscriber sites to the Central Office (CO) serving those sites. The present invention specifically concerns a method and apparatus for allowing the copper twisted pair at individual subscriber sites, to reappear at the central office and allows these subscribers within a specified proximity to be interconnected in the form of a Local Area Network (LAN).

BACKGROUND OF THE INVENTION

There are a number of ways to enhance the performance of an unshielded twisted pair of wires that service a customer with voice band service. One could increase the present information rate or move to more sophisticated modulation schemes but ultimately the biggest performance leap is determined by the ability to adjust or fine tune the integrity of the physical layer. In some cases tuning the integrity of that layer (i.e. twisted copper pair) is plainly not practical. Since all telephony customers are ultimately connected to the central office (CO) by way of the twisted pair that is in their respective homes, it is not a new concept to have a group of customers' lines all terminate into a "vault". From this vault a simple connection is made ultimately back to the CO. This concept is very straightforward as long as the type of service and the modularity of the physical layer are constant.

With the advent of technologies like xDSL (a family of generic Digital Subscriber Lines), the mix has changed a bit. Now the twisted pair that used to be for voice band communications is being pushed to provide more than 64-kilobit service. Even more, multiple combinations of twisted pair can be used to provide the end user with upwards of 20 Megabits/second. Squeezing the performance out of the twisted pair does not come without a downside. The provider of the service will, in most cases, still be held accountable for the traffic that the twisted pair was originally designed for. Careful planning must be taken not to design without regard to POTS (Plain Old Telephone Service) service. Recent efforts have been made in systems that employ the Digital Subscriber Line Access Multiplexers (DSLAMs) to provide low frequency filtering to insure that POTS traffic is not lost in the high rate xDSL traffic. There are inefficiencies associated with the DSLAM and with filtering as discussed below.

There are existing systems that create Local Area Networks (LANs) but these system are expensive to implement since they require the installation of a transmission media which has a much higher bandwidth than the copper pair, between the central office and the subscriber premise. There are several local access strategies and architectures deployed by LECs, cable service providers (CSPs), and digital broadcast TV distributors. All have some inefficiency and are generally costly.

SUMMARY OF THE INVENTION

The present embodiment of the invention provides a novel means for connecting a subscriber to a local area network (LAN) by extending the copper wire in a subscriber loop, to a point of presence (POP) in the serving network, by a virtual twisted pair and by allowing the subscribers within a loop to inter-connect and operate as a LAN. The present invention also allows the easy creation of a much larger network by providing connectivity to other subscriber loops and service providers offering Internet access. The present embodiment of the invention may be used to carry any traffic that requires high bandwidth.

The present invention further provides a tremendous advantage in the existing telephone network by using the current infrastructure and enhancing it to allow the copper pair at each subscriber site to reappear at the central office (CO) with minimum use of the infra structure of the existing network. It also allows users within a specified region to be interconnected and operate as a LAN.

The value of providing a point of presence (POP) for accessing a subscriber with minimum action of the Local Exchange Carrier (LEC) is very important. There are several local access strategies and architectures deployed by LECs, cable service providers (CSPs), and digital broadcast TV distributors. This proposal herein addresses two primary configurations 1) Direct connection between customer and central office (CO) and 2) Proposals that involve cable, including HFC, and telephony distribution concentrated at an intermediate collection point (vault) prior to "bundling" all branches onto a high bandwidth trunk which then connects to a CO.

In another sense the invention is embodied as a system for enabling a local loop partial bypass to interact with a plurality of networks through an interface or linking circuitry joining the loop to a destination/recipient-processing network. Originating signals normally applied to the local loop are concentrated by multiplexing onto a common destination network, such as a (LAN). Packet signals and switched signals are identified and handled separately by different modems during processing and transmission by the loop bypass to the destination/recipient network Signals are provide transmission paths should the modems be bypassed.

While the connecting links are identified, in the illustrative embodiment as twisted pair or optical links, links such as cable/coax and wireless RF may also be used without departing from the spirit and scope of the invention. The principals of the invention may also be applied in wireless systems as well.

BRIEF DESCRIPTION OF DRAWINGS OF THE INVENTION

DETAILED DESCRIPTION

Figure 1:
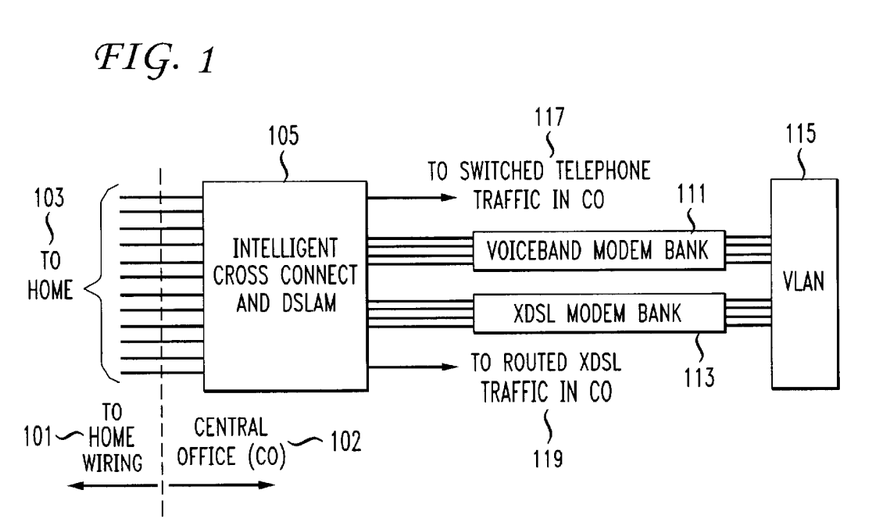
FIG. 1 is a block schematic showing the copper loop extender module (CLEM)

The present invention provides a novel approach that allows the copper pair at each subscriber site, serviced by an alternate supplier to the Local Exchange Carrier (LEC), to reappear at the Central Office (CO) by -passing much of the LEC network. This is achieved by a Copper Loop Extender Module (CLEM) such as is illustrated in FIG. 1. The CLEM is not as much a specific device as it is a system of complementing components. It consists of two modestly intelligent end-points and a flexible trunk between the two. On one side 101 of the CLEM is the customer's twisted pair 103 and the other side 102 is at the CO location. The to-the-home wiring 103 is connected to an intelligent cross connect and digital subscriber line access multiplier (DSLAM) 105. This circuitry concentrates incoming traffic by use of processing techniques such as Time Division Multiplexing (TDM). As shown there are two output streams 107 and 109, which are, input to a voice band modem bank 111 and a xDSL modem bank 113 to feed a local area network such as the virtual local area network (VLAN) 115. Traffic not intended for the VLAN 115 is directed by the DSLAM 105 to the central office processors via the switched telephony traffic lead 117 and a routed xDSL traffic lead 119. While copper loop is discussed herein various alternatives will be understood to be equivalent by those skilled in the art such as cable/coax connections to the subscriber device.

Figure 2:
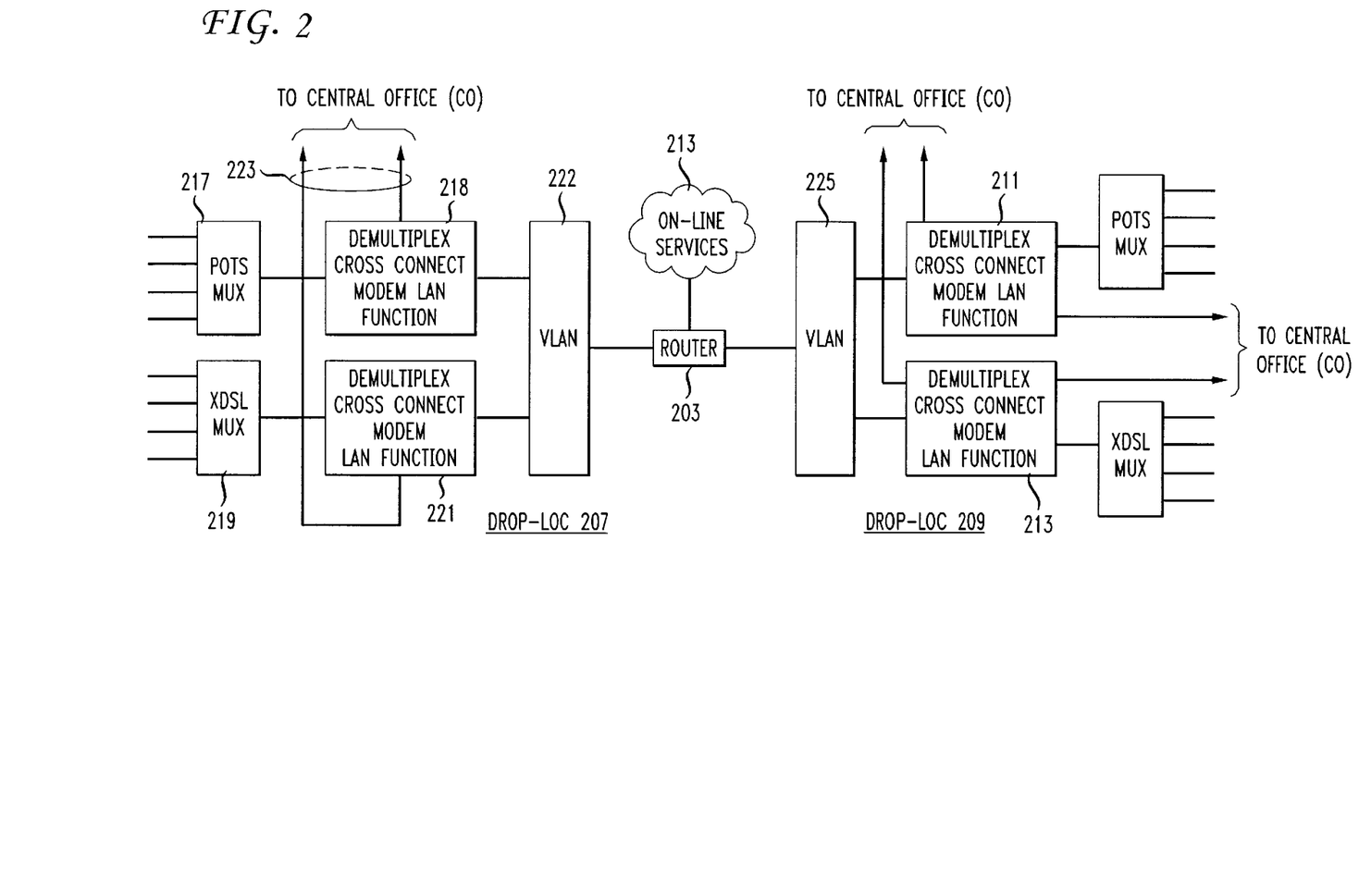
FIG. 2 is a block schematic showing interconnectivity of LAN operating control (LOC) with a distributed point of presence (DPOP)

The circuitry arrangement to provide a distributed point of presence (DPOP) is illustrated schematically in FIG. 2 which illustrates multiple DPOP-LOCs 207 and 209 connected to an internet on-line service provider (ISP) such as AT&T WorldNet® Services 213. The circuitry includes a router 203 connected to interconnect two differently sourced DPOP-LOCs 207 and 209 to an AT&T WorldNet® Services connection 213. Plain Old Telephone Service (POTS) input and xDSL input is supplied to Multiplexers 217 and 219 and 115 demultiplexed in cross connects and modems 218 and 221 before application to the DPOP-LOC's virtual local area network (VLAN) 222. Leads 223 are provided for direct connection to the central office. DPOP-LOC 209 is connected a similar manner. It includes cross connects and modems 211 and 213 coupled to VLAN 225 which is in turn connected to router 203 and the on-line service provider 213. This configuration allows the service provider to bypass owners of the vault and/or central office (CO) and creates a Virtual LAN that extends into the "neighborhood" of the subscriber.

Figure 3:
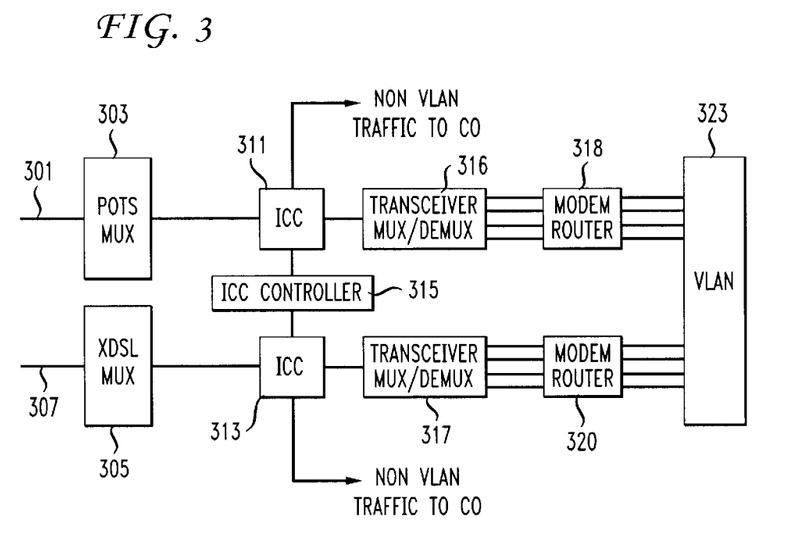
FIG. 3 is a block schematic of a DPOPLOC device combining the DPOP and LOC as shown in FIG. 2.

The Intelligent Cross-Connect Controllers (ICC) 311 and 313, shown in FIG. 3, receive commands, requests and roster information from the subscriber and system administrator. The LAN membership database is also kept in the ICC Controller 315. The ICC Controller tells the ICC, which multiplexed signals to pass through the system and which to cross-connect to the Transceiver/Mux-Demux 316 and 317. The Transceiver/Mux- Demux has the ability to multiplex and demultiplex a TDM signal and has the frequency agility to up-convert and down-convert, multiplex and demultiplex a frequency division multiplexed (FDM) signal as well. The demultiplexed signal reappears on a number of outputs, which are connected to a side of the modem bank including modems 318 and 320. At the modem bank, it would not be necessary to support an equal number of lines entering and leaving the bank because there may be a more cost effective solution found in the concentration or pooling of customers per modem. Each modem will be directly connected to the VLAN 323. The VLAN 323 could take the form of a physical bus or backplane. The entire LOC is a full duplex system.

A DPOP-LOC (distributed point of presence-LAN operating control) connection such as is illustrated in FIG. 3 is suitable for application in the local loop. The connecting trunks, in the illustrative embodiment, are a fiber or a wireless optical link that will support a n-WDM (Wave Division Multiplexed) system. In a typical configuration there will be n/2 wavelengths handling the upstream traffic and there will be n/2 handling the downstream traffic. In both 140 directions there will be a wavelength handling POTS ($\lambda_{POTS}$) multiplexer 303 and the other multiplexer 305 handling xDSL ($\lambda_{xDSL}$). For each subscriber with POTS, a frequency assignment is made with respect to that subscriber's twisted pair 301. Thus communications over the fiber are by frequency division multiplexing (FDM). Once this signal is recovered at the complementing end point in the CO, virtual access to the customer's twisted pair bearing POTS can be achieved. For those customers wanting an additional twisted pair 307 so that xDSL service can be provided to their homes, the frequency assignment that was applicable during POTS service would effectively be torn down and that customer's communications would happen through the path including multiplexer 305 supported by the $\lambda_{xDSL}$. (It must be noted that xDSL traffic, prior to demodulation, can be frequency division multiplexed as well. This would eliminate a necessary bank of xDSL modems in the CLEM.) The customer's information would then be accessed in the time division multiplexed timeslot that is assigned to it. This arrangement applies whether the customer uses two or three twisted pair to establish a service. For those customers who want both POTS and xDSL, this implementation puts the burden of filtering on the network side of the optics.

Figure 4:
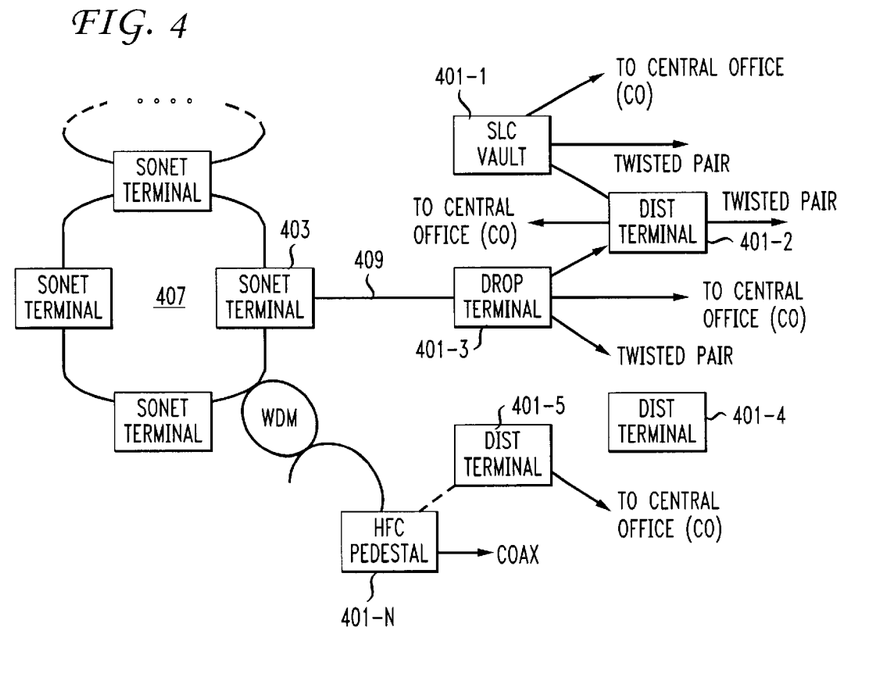
FIG. 4 is a block schematic of local loop connectivity.

The connections of a broad network are illustrated in FIG. 4, which shows schematically local loop connectivity. A plurality of twisted pair from the subscriber is shown connected to distribution terminals 401-1 to 401-N. Some of these distribution terminals are interconnected with other distribution terminals. In one instance a coaxial cable 411 is connected to the home from Terminal 401-N. The distribution terminal 401-1 is a subscriber loop carrier vault including twisted pair to the subscriber and further has a connection to the distribution terminal 401-2. One distribution terminal 401-3 is a DPOP terminal, which is connected directly or indirectly to all the other distribution terminals. Distribution terminal 401-3 is connected, via a trunk 409, to a SONET terminal 403 included in a SONET ring 407. The SONET ring 407, owned by the service provider, permits networking services to be provided to the subscriber independently or nearly so of the local exchange carrier (LEC).

With the local telecommunication deregulation, anticipated, there will exist a desegregation of "neighborhood" communications customers. For instance, locations where a local exchange carrier (LEC) provides local phone service, will contain customers that will migrate to other service providers. To create an initial point-of-presence (POP) they will have to rent space in the central office (CO). For reasons discussed herein the service provider would like to "see the twisted pair from its customers at the CO", but with as little intervention to existing hardware/software as possible. Establishing a one-to-one mapping of the twisted pair(s) from the home to the CO such as shown in FIG. 4. may control such reduction of use of existing connections.

Probably the most efficient connection, would be through call control or signaling. With SS7 and circuit switched call establishment the source calling number may be searched through a customer database and if found, the provider will know at the CO that this call is from one of its customers via a copper loop extender module CLEM. The CLEM will retain a one-to-one mapping of its LAN clients and hence will be able to identify each resident to the CO through call control and/or through the an identifiable packet connection could relay such information to the CO through a dedicated channel over the trunk mentioned above. If it is assumed that a virtual asynchronous packet transport scheme is the layer 2 protocol of choice then during the decomposition of the cells the "customer twisted pair" may be extracted out of either the signaling cells or possibly the user data cells.

From the basic premise of making the twisted pair reappear at the central office and the architecture described thus far, the inherent position of LAN manipulation is gained. Every customer whose twisted pair terminates on the vault has the potential to be a LAN client. Whether the vault termination is POTS or a xDSL service, the data recovered will have to be translated into a digital format that jibes with the lower layer protocols of the LAN. Once the LAN is established content providers could reach all clients in a broadcast format. The content providers as well as LAN peers could also be hand picked by the customer. All of this control would reside in the CLEM. The CLEM will inspect the destination of all peer initiated calls, if the destination resides on the LAN hosted by the CLEM, an intra-LAN connection will be made, else the CLEM will proceed to transport this call on the trunk as mentioned above.

In the entire scheme of the aforementioned idea, if the twisted pair is made to reappear at the CO then there is not a need to relegate the service to POTS or xDSL. Literally any service could be supported if the appropriate modems could be supported in the infrastructure. ISDN could very well be supported in such a configuration as well. The theme of this idea could also be applied to other hybrid [fiber] access solutions.

To completely support the operations of a fully functioning CLEM, the LAN Operations Controller (LOC) is a necessity. Per the description of the CLEM, the LOC will allow customers in a given area serviced by a 'vault' to customize their participation on a LAN.

An intelligent network component, the Distributed (POP) LAN Operations Controller (DPOP-LOC), could either be physically located in the vault or CO, that will provide service distribution to the customer and bypass the LECs and CSPs, providers who up to this point that have had a "strong hold" on local access to the customer. Not only will the DPOP-LOC provide bypass of the previous mentioned, whether located at the CO or vault, and render a service provider and subscriber espousal in a desegregated environment, but it will allow high bandwidth service deployment, when utilizing the Virtual LAN (VLAN) as being a more efficient packet based network than the current circuit switched voice network.

Non-telephony information that enters the CO is usually routed around the switched infrastructure and to its final destination. This characteristic allows the support of a larger VLAN that extends beyond the service area of the vault. The router used to support such a large VLAN could be located in the CO but it is not mandatory. Effectively a VLAN covering an entire metropolitan area, with strategic placement of routers and gateways, could be configured without encountering a single LEC CO.

The LAN operating control (LOC) performs valuable control functions including the following: 1. selective cross connect functions; 2. modem connections; 3. LAN configuration functions; 4. LAN Arbitration between competing services; and 5. packet based transport control.

If there is a mutual interest between peers to establish a LAN environment, a command would be sent to the DPOP-LOC and the DPOP-LOC would set up the request. The DPOP-LOC has the ability to set up many different virtual LANs (VLAN) and has the ability to support instances where a single party is a member of a number of LAN groups. At the front end of the LOC is an intelligent cross-connect (see FIG. 3). The intelligent cross-connect receives the LAN's roster information. It controls which of the incoming multiplexed information is destined to the central office or detoured to the LAN.

Specific methods for implementing part of the Distributed Point of Presence-LAN Operations Controller are discussed below with reference to FIG. 5. The mechanics of creating multiplexed signals comprised of individual user signals, on various communication channels as well as the reverse process of demultiplexing the signals is discussed below.

Figure 5:
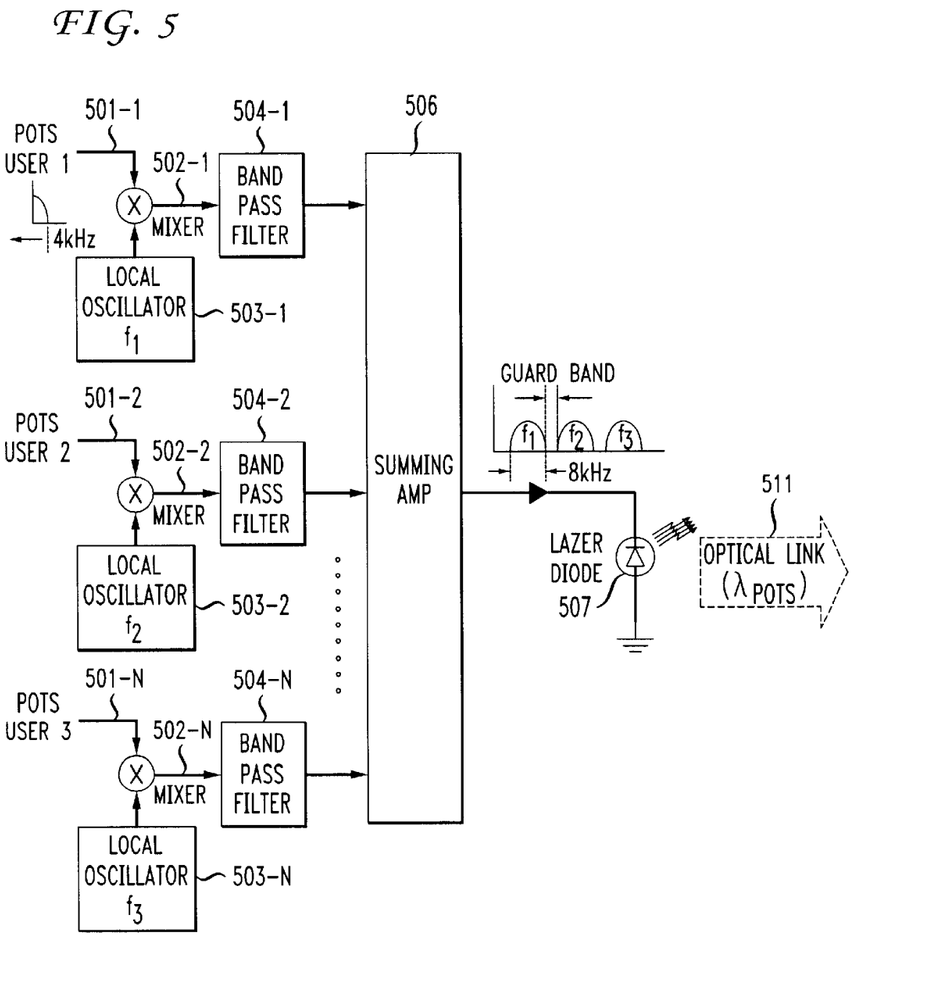
FIG. 5 is a block schematic illustrating the multiplexing of multiple POTS lines onto one optical link.

FIG. 5, illustrates a simple configuration for multiplexing multiple POTS lines on to one optical link. As can be seen, the configuration looks very similar to typical frequency division multiple access (FDMA) systems with a double-balanced mixer used in conjunction with a band-pass filter 504-N to convert the baseband POTS signal, supplied on leads 501-N, into mixers 502-N, supplied by a signal of twice the POTS bandwidth centered at the frequency of the local oscillator 503-N. Output of the mixers 502-N is applied to bandpass filters 504-N. A summing amplifier 506 is used to combine all the signals, output by the filters, into one composite signal before it is converted to light and sent over the optical link 511. The frequency selection of the local oscillators 503-N needs to be selected such that the resulting modulated outputs do not overlap in frequency and have a sufficient guard band between them. A laser diode 507 converts the electrical signals, which are transmitted over a light link 511 to the central office.

Figure 6:
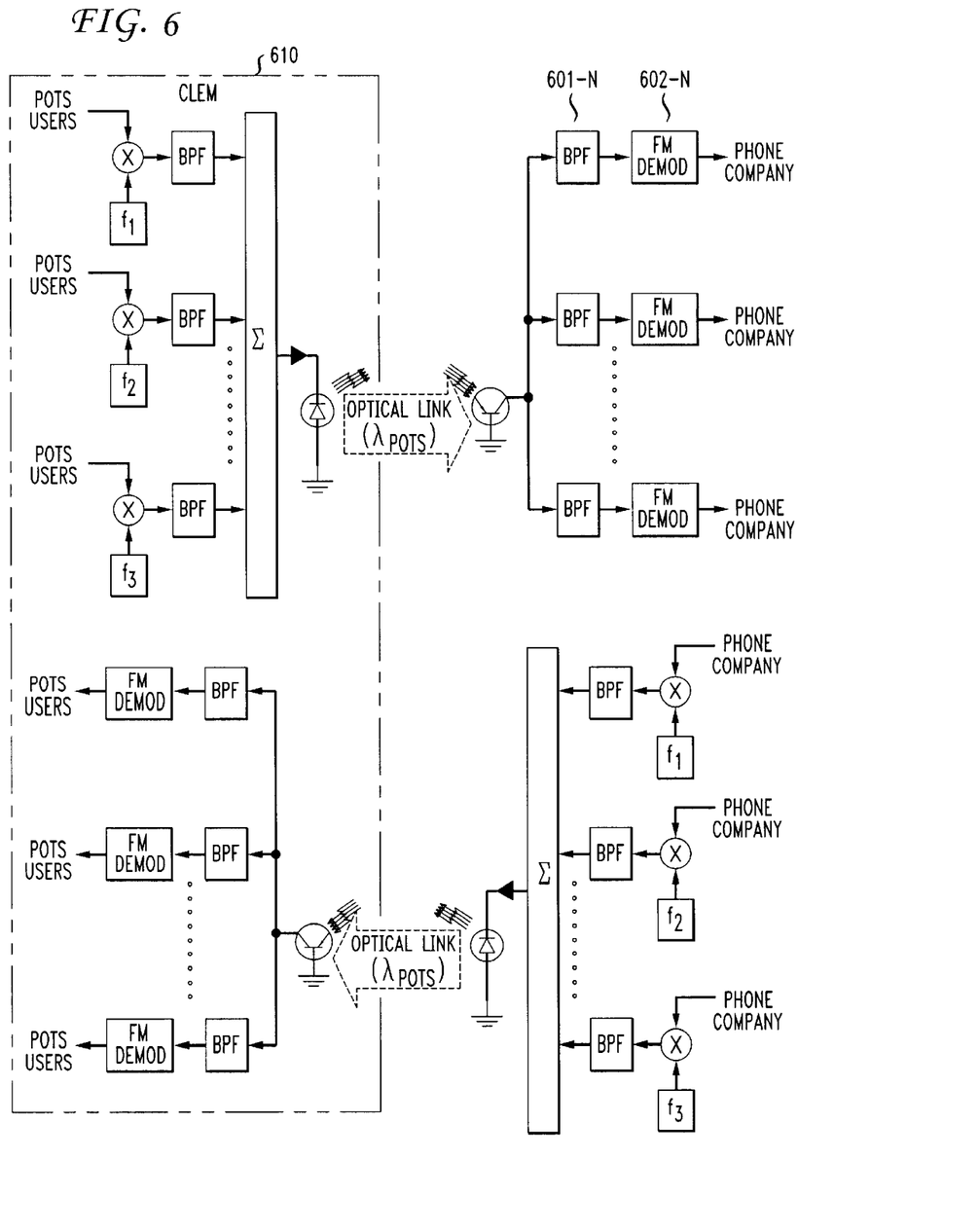
FIG. 6 is a schematic of a full duplex system for application to POTS.

The demultiplexing on the CO-side, such as indicated in FIG. 6, is performed by substantially bandpass filtering, via filters 601-N, followed by FM demodulation, in demodulators 602-N. FM demodulation may take place directly with a discriminator circuit or indirectly with a phase lock loop (PLL) circuit. Either method is used commonly in FM demodulation systems. Digital processes for FM demodulation also exist and are becoming increasingly common. For digital FM demodulation, it is possible to digitize the entire bandwidth; digitally bandpass filter the individual channels out and then digitally demodulate each channel.

FIG. 6 shows a basic CLEM architecture handling POTS-only traffic. In order to introduce xDSL traffic into the system, several options exist. The most obvious configuration would be a system similar to the POTS only one just described, but with a bandwidth of POTS+xDSL for each twisted pair instead of just POTS. This method allows direct access to all the individual twisted pair information, which can then be rerouted at the CO. The specific architecture is shown in the FIG. 7.

Figure 7:
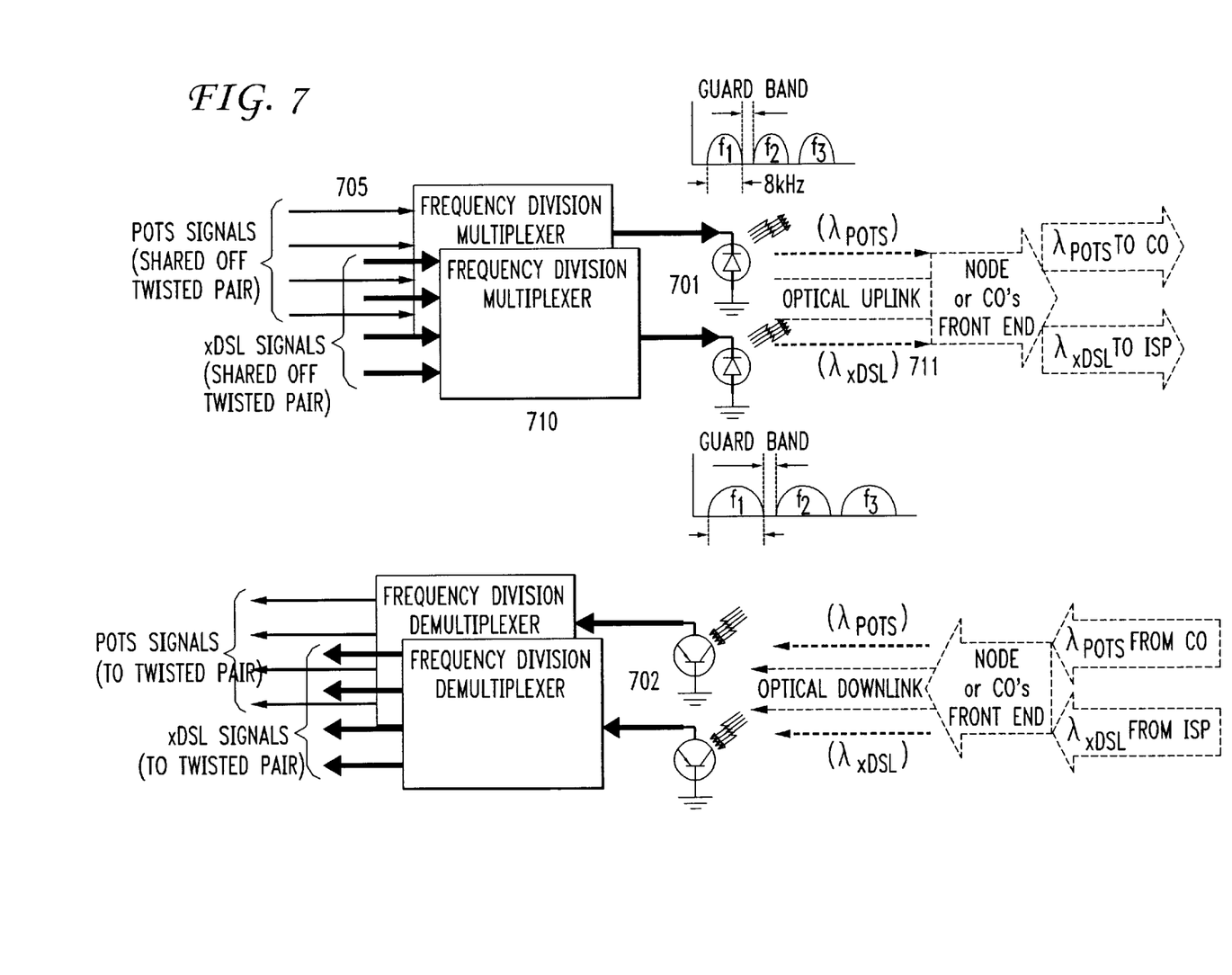
FIG. 7 is a schematic illustrating multiplexing POTS and xDSL traffic by use of the copper loop extender module (CLEM)

Since most xDSL information is ultimately destined to an Internet Service Provider (i.e., AT&T WorldNet® Services), it may be desirable to have a capability of easily separating xDSL traffic from the POTS such that the signals can then be routed appropriately. This can be done, as shown in FIG. 7, by separating the POTS information from the xDSL at the twisted pair inputs 701–704 to the CLEM with appropriate filtering (i.e., 4 kHz low pass filtering for POTS and band pass filtering for xDSL). The separated signals can be routed through independent FDMA systems. The POTS-only FDMA system will use a laser diode 721–722 with a particular wavelength ($\lambda_{POTS}$); the xDSL-only FDMA system will use another wavelength ($\lambda_{xDSL}$) Please refer to FIG. 7. The two laser diode systems (transmitter-receiver pairs) will use the same optical link with two paths 711 and 712 essentially orthogonal to each other by virtue of the different wavelengths of the optical signal. In this way, all xDSL traffic can easily extracted from the POTS and rerouted at either a separate node or at the Central Office using common optical filter techniques.

It may also be desirable to group together customers based on who their local access provider is or who their Internet service provider is. Different wavelengths are used for the optical links based on whether the customer on the other side of the twisted pair is using AT&T or another LEC for POTS service as well as different wavelengths based on whether or not the customer is using AT&T WorldNet® Services or America Online service for xDSL service. This would allow signals to be optically filtered and immediately routed to the appropriate service provider (FIG. 7).

One other embodiment of the CLEM would comprise of xDSL modems within the CLEM itself, essentially functioning to convert xDSL-formatted data into raw data FDMA-multiplexed over the optical link to be routed to the CO or as with the previously described systems, routed directly to the appropriate xDSL service provider. This embodiment may become necessary if the FM multiplexing of the xDSL-formatted data causes distortion and thus higher BERs.

Figure 8:
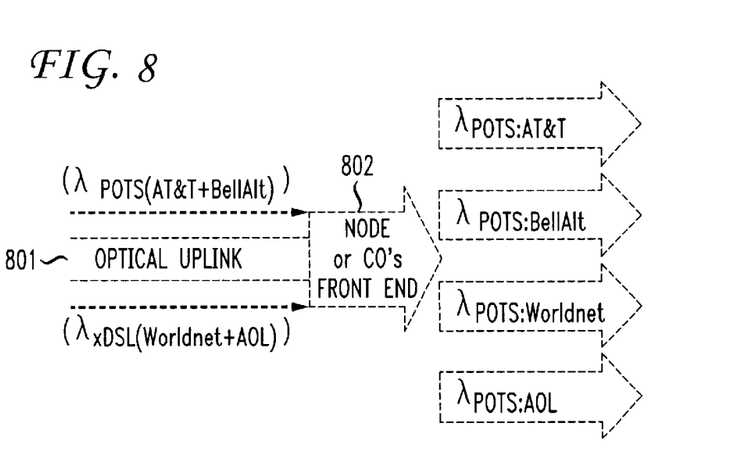
FIG. 8 is a schematic of multiplexing of different service providers.

Different service providers may also be, multiplexed as indicated in FIG. 8. Incoming combined service signals 801 to a CO-node 802 where the signals are multiplexed into separate service streams 803.

While the illustrative embodiments herein have been described with particularity to twisted pair and optical links, the implementation of the invention with RF wireless and coax cable links will readily suggest themselves to those skilled in the art.

What is claimed:

1. A method of enabling a subscriber's telephone twisted pair to appear at a central office of a telephone network in the absence of a dedicated direct connection between a subscriber station set and the central office, comprising the steps of: creating a virtual twisted pair between the subscriber and the central office, comprising the stepd of:

creating a virtual twisted pair between the subscriber station and the central office by:

intelligently cross connecting each subscriber signal from the telephone twisted pair to a modem/filter bank;

combining subscriber signals by summing the modem/filter bank output;

converting the summed modem/filter bank output to a wave division multiplexed (WDM) optical signal; and coupling the WDM signal optically to the central office and reconverting the WDM optical signal to the original subscriber signal by filtering techniques.

2. The method of claim 1, further including:

a step of mixing the subscriber signals with a frequency signal $f_1$; and a step of bandpass filtering the mixed subscriber signals.

3. The method of claim 1, wherein the step of:

converting the summed bank output includes exciting a laser diode with the summed bank output.

4. The method of claim 1, wherein:

the step of optical coupling includes a free space optical connection.

5. The method of claim 1, wherein:

the step of optical coupling includes a light fiber transmission link.

6. The method of claim 1, wherein:

the step of coupling the signal optically includes separating POTS and xDSL signals, for transmission, by wavelength division multiplexing.

7. The method of claim 1 further comprising the step of separating services provided to the subscriber by wavelength division multiplexing.

8. A communication interface for enabling a subscriber's telephone twisted pair to appear at a central office of a telephone network in the absence of a dedicated direct connection between a subscriber station set and the central office, comprising:

a virtual twisted pair interconnecting the subscriber station and the central office of a telephone network, including:

an intelligent cross connect and a modem/filter bank, the intelligent cross connect connecting each subscriber signal from the telephone twisted pair to the modem/filter bank;

a summing circuit connected for combining subscriber signals of the modem/filter bank;

an electrical/optical converter connected for converting the combined subscriber signals into a wave division multiplexed (WDM) optical signal;

a light transmission medium connected for optically coupling the WDM optical signal to the central office and an optical/electrical converter connected for reconverting the WDM optical signal; and bandpass filters connected for recovering original transmitted subscriber signals.

9. The communication interface of claim 8, further including:

mixing circuits and a frequency source of frequency $f_1$ connected for mixing subscriber signals with the $f_1$ frequency signal; and the mixing circuits connected to band pass filters for band pass filtering the mixed subscriber signals.

10. The communication interface of claim 8, further including:

a laser diode connected to be excited by the combined subscriber signals.

11. The communication interface of claim 8, wherein:

the light transmission medium is a free space medium.

12. The communication interface of claim 8, wherein:

the light transmission medium is a light fiber transmission link.

* * * * *